United States Patent [19]

Anezaki

[11] Patent Number: 5,263,137
[45] Date of Patent: Nov. 16, 1993

[54] SYNTAX CONVERTING APPARATUS FOR DECOMPOSING DIFFERENT PORTIONS OF A DATA STRING DIFFERENTLY DEPENDING ON WHETHER A DATA STRING IS AN EXTERNAL TYPE DATA STRING

[75] Inventor: Akihiro Anezaki, Tokyo, Japan

[73] Assignee: NEC Corporation, Tokyo, Japan

[21] Appl. No.: 869,837

[22] Filed: Apr. 16, 1992

Related U.S. Application Data

[63] Continuation of Ser. No. 522,790, May 14, 1990, abandoned.

[30] Foreign Application Priority Data

May 12, 1989 [JP] Japan .................... 1-119530

[51] Int. Cl.$^5$ ............................. G06F 15/20
[52] U.S. Cl. .................... 395/200; 364/514; 364/940.81; 364/927.96; 364/940.62; 364/919; 364/940; 364/940.61; 364/940.64; 364/940.92; 364/DIG. 2
[58] Field of Search .............. 364/DIG. 1, DIG. 2, 364/514, 519; 395/200, 325, 275, 800; 370/60, 62

[56] References Cited

U.S. PATENT DOCUMENTS

| | | | |
|---|---|---|---|
| 4,500,960 | 2/1985 | Babecki et al. | 364/200 |
| 4,586,134 | 4/1986 | Norstedt | 364/200 |
| 4,750,114 | 6/1988 | Histle | 364/200 |
| 4,831,518 | 5/1989 | Yu et al. | 364/200 |
| 4,835,674 | 5/1989 | Collins et al. | 364/200 |
| 4,853,875 | 8/1989 | Brown | 364/514 |
| 4,888,726 | 12/1989 | Struger et al. | 364/200 |
| 4,941,089 | 7/1990 | Fischer | 364/200 |
| 4,977,499 | 12/1990 | Banning et al. | 364/200 |
| 4,994,998 | 2/1991 | Anezaki | 364/900 |
| 5,056,058 | 10/1991 | Hirata et al. | 364/900 |

OTHER PUBLICATIONS

"Development and Evaluation of APRICOT (Tools for Abstract Syntax Notation One)", Tetsuo Nakakawaji et al, Proceedings of the Second International Symposium on Interoperable Information Systems, 1998.

"ASN.1 Tools for Semi-Automatic Implementation of OSI Application Layer Protocols", Yasuhiro Ohara et al, Proceedings of the Second International Symposium on Interoperable Information Systems, 1988.

"An architecture for an ASN.1 Encoder/Decoder", F. Caneschi and E. Merelli, Network Protocols and Standards, Elsevier Science Published B.V., 1988.

"Prospect, A Tool for Protocol Specification and Conformance Testing", Bernhard Plattner et al, Message Handling Systems/ R. Speth (Editor), Elsevier Science Publishers, B.V., IFIP, 1988.

*Primary Examiner*—Michael R. Fleming
*Assistant Examiner*—Gopal C. Ray
*Attorney, Agent, or Firm*—Foley & Lardner

[57] ABSTRACT

A syntax converting apparatus performs conversions between an abstract syntax and a transfer syntax in a presentation layer, defined by an Open Systems Interconnection (OSI). The presentation layer determines the syntax, which describes application processes, and exchanges this syntax with a syntax to be transferred. The syntax converting apparatus is capable of separately decomposing presentation protocol data units (PDUs), which are defined by two different standards, for example, Standard x and Standard y. This is accomplished using a decoding and a decomposing unit in the presentation layer. The decoding unit decodes data strings encoded in accordance with ISO 8825 ASN.1 Basic Encoding Rules, and the decomposing unit decomposes this decoded data with each of the protocol specification units, describing the abstract syntax thereof.

20 Claims, 7 Drawing Sheets

FIG. 4A

'9FE35EF8F9FAD73583FEFE41EED7F0F9F9D73583FD
FEFE5FFAFCFCFFBDDD'H

51 Identifier OCTET
52 Length OCTET
53 content OCTET

| 60 | 1C | A1 | 07 | 06 | 05 | 28CA7C0101 | BE | 11 | 28 | 0F |

| 06 | 06 | 28CA7C020101 | A0 | 05 | 03 | 03 | 004222 |

APDU

ACSE - 1 DEFINITIONS ::=
  BEGIN
    ACSE - apdu ::= CHOICE {
                  aarq   AARQ-apdu,
                  ...
                }
    AARQ-apdu ::= [APPLICATION 0] IMPLICIT
          SEQUNCE {
            ...
      61 ①→ application-context-name [1]
                  OBJECT IDENTIFIER,
            ...
      61 ②→ user-information [30] IMPLICIT
                  SEQUENCE OF EXTERNAL
    ...       }
END
       ISO 8650

| ITEM 61 | DATA LENGTH 62 | VALUE 63 |
|---|---|---|
| ① | 5 | '28CA7C0101' H |
| ② | 17 | |
| '280F060628CA7C020101A0050303004222' H | | |

ISO 8650

```
EXTERNAL ::= [UNIVERSAL 8] IMPLICIT SEQUENCE{
   ①→   direct-reference   OBJECT IDENTIFIER
 61                                           OPTIONAL,
         ...
         encoding CHOICE {
   ②→           single-ASN1-type [0]ANY,
 61              ...
                }
         }
              ISO 8824
```

| 61 | 62 | 63 |
|---|---|---|
| ① | 6 | '28CA7C020101' H |
| ② | 5 | '0303004222' H |

ISO 8824

FIG. 7A
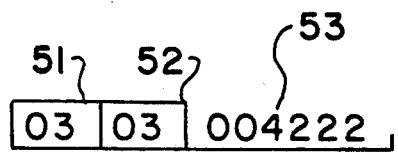
51  52  53
| 03 | 03 | 004222 |
FIG. 7B
Association Information DEFINITIONS ::=
  BEGIN
    CMIP User Information ::= Functional Units
    ① —— Functional Units ::= BIT STRING {
61                                            ...
  END                                         }
        ISO 9596              (CMIP)
FIG. 7C
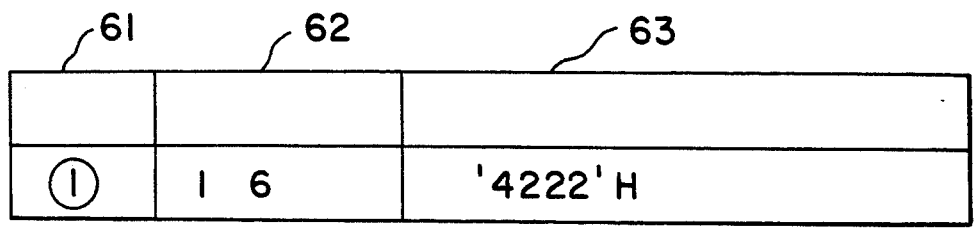
| 61 | 62 | 63 |
|----|----|----|
| ①  | 1 6 | '4222'H |
ISO 9596

SYNTAX CONVERTING APPARATUS FOR DECOMPOSING DIFFERENT PORTIONS OF A DATA STRING DIFFERENTLY DEPENDING ON WHETHER A DATA STRING IS AN EXTERNAL TYPE DATA STRING

This application is a continuation of application Ser. No. 07/522,790, filed May 14, 1990, now abandoned.

BACKGROUND OF THE INVENTION

The present invention relates to a syntax converting apparatus to perform conversion between an abstract syntax and a transfer syntax in a presentation layer, defined by an Open Systems Interconnection (OSI), an international standard for the interconnection of systems.

The presentation layer of OSI is a layer to alter the set of sending/receiving codes between application processes, data compression and the cryptographic form of representation. In this layer, the syntax is determined which describes application processes themselves and an exchange is achieved with a syntax to be transferred.

The functional module, which performs actual communication of information related to an application layer, is known as the application entity. The module that performs actual communication of information related to a presentation layer is known as the presentation entity. The form of representation of the data given and received between the application entity and presentation entity is called an abstract syntax, and the form of the data transferred between presentation entities is called, a transfer syntax. The abstract syntax is intended to define, in a standardized manner, the semantics of data represented in an internal code, uniquely specified for an actual computer system or the like. Some techniques for representing the abstract syntax and the transfer syntax, are the ISO (International Organization for Standardization) 8824 ASN.1 (Abstract Syntax Notation One) and the ISO 8825 ASN.1 Basic Encoding Rules.

The method used in related art of decomposing a data string encoded in the presentation layer is to indiscriminately take out the contents' octets defined by the ASN.1 encoding rules. By this method, all of the items are decomposed in the presentation layer, and handed over to the application layer.

Suppose that, in such a syntax converting apparatus, it has become necessary to separately decompose presentation protocol data units (PDUs), which are separately defined by Standard x and Standard y. Then, the xPDU defined by Standard x is decomposed by Standard x first, and the yPDU defined by Standard y is decomposed by Standard y later. However, if the identifier octet "31"H indicating the SET type at the top of the yPDU is absent, the yPDU cannot be decomposed by Standard y. Therefore, the PDUs separately defined by Standard x and Standard y are obliged to be decomposed together in the presentation layer. This results in the disadvantage that, along with an increase in standards in the application layer, decomposing all the PDUs in the presentation layer invites increases in abstract syntaxes to be managed (provisions on the PDU data structure) and items to be interfaced with an upper layer.

SUMMARY OF THE INVENTION

An object of the present invention is to obviate the aforementioned disadvantage and provide a syntax converting apparatus which requires no exchange of decomposed data in a structural entity in a defined form and thereby simplifies interfacing.

An apparatus according to one aspect of the invention is a syntax converting apparatus for the presentation layer of OSI defined by the ISO 8822 Presentation Service Definition and the ISO 8823 Presentation Protocol Specification. The apparatus comprises a decoding unit for decoding data strings encoded in accordance with the ISO 8825 ASN.1 Basic Encoding Rules, and a decomposing unit for decomposing the output of the decoding unit with each of the protocol specification units defining the abstract syntax thereof, and supplying the result to an upper or application layer.

The decoding unit performs the decoding (for example, bit inversion) of data encoded in accordance with the ASN.1 Basic Encoding Rules. The decomposing unit decomposes the output of the decoding unit with each of the protocol specification units of its abstract syntax. By these processes, an EXTERNAL type and an ANY type decomposing elements decompose the respectively assigned segments of the output of the decomposing unit in the upper or application layers immediately before Identifier octets, instead of immediately before Contents octets. Hence, there is no need to exchange decomposed data in a structural entity in a defined form, thereby simplifying interfacing.

BRIEF DESCRIPTION OF THE DRAWINGS

Other features, configurations and advantages of the present invention will become more apparent when taken in conjunction with the accompanying drawings, in which:

FIGS. 4A and 4B illustrate an encoded octet string taken out of a PPDU of the preferred embodiment of the invention and an encoded octet string which becomes the output;

FIGS. 7A-7C illustrate an encoded octet string, which is to be decomposed by a second application service element of the application layer, and the standard and the result of decomposing the data structure thereof.

DETAILED DESCRIPTION OF THE PREFERRED EMBODIMENT

Figure 1:
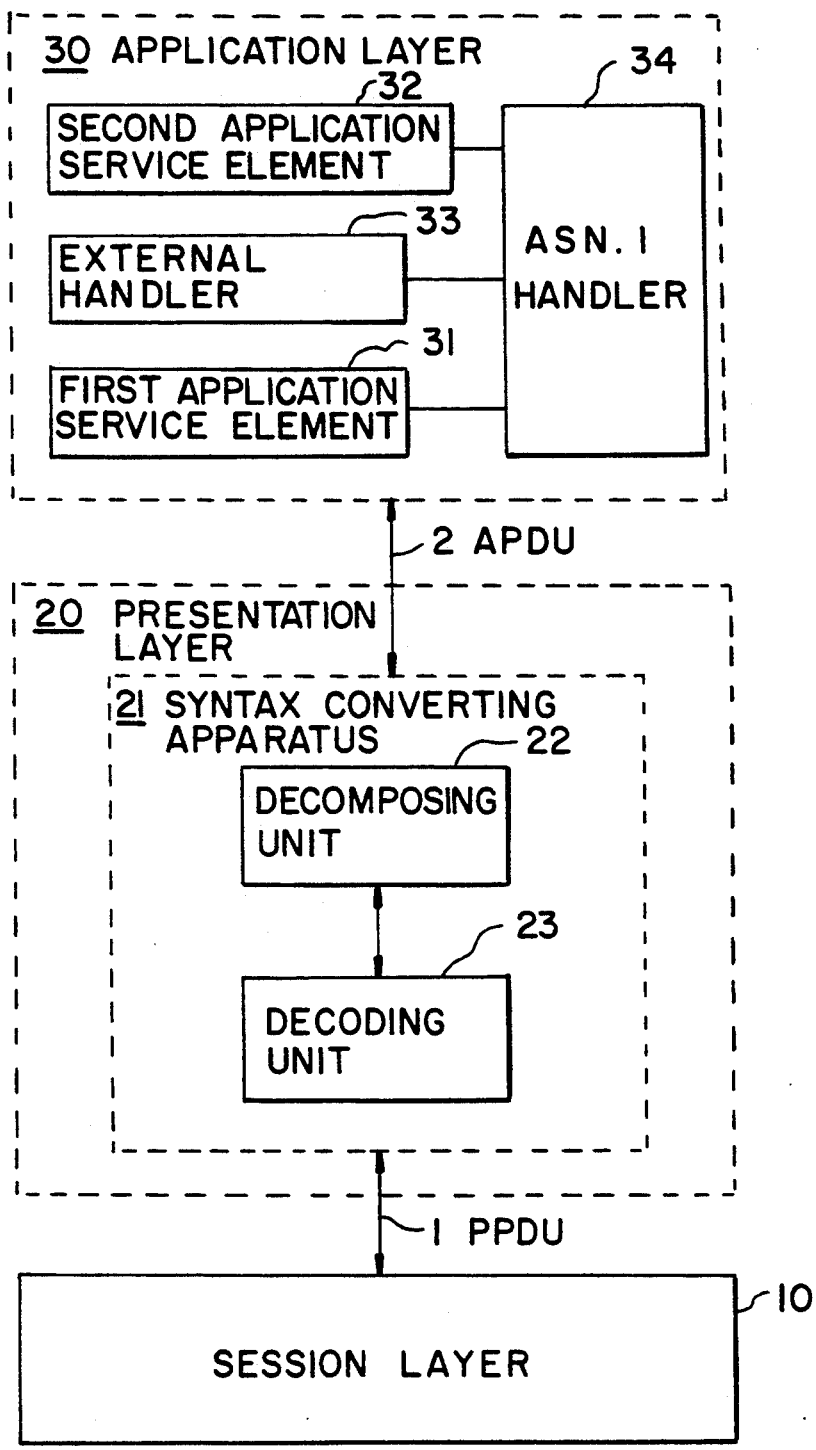
FIG. 1 illustrates a preferred embodiment of the invention.

Referring to FIG. 1, a syntax converting apparatus 21, which is a preferred embodiment of the present invention, comprises a decoding unit 23 for decoding presentation protocol data units (PPDU) 1, which are data encoded in accordance with the ISO 8825 ASN.1

Basic Encoding Rules and a entered from a session layer 10, and decomposing unit 22 for decomposing the output of the decoding unit 23.

One feature of the invention is that the decomposing unit 22 includes a capability of decomposing the output of the decoding unit 23 with each of the protocol specification units by decomposing the abstract syntax thereof and supplying the result to an application layer 30 as an upper layer.

The application layer 30 comprises the following sections: a first application service element 31, which achieves processing as a service element from values taken out by decomposing an octet string encoded by the ASN.1 Basic Encoding Rules in accordance with an ASN.1-described data structure decomposed by ISO 8650; a second application service element 32, which achieves processing as a service element from values taken out by decomposing an octet string encoded by the ASN.1 Basic Encoding Rules in accordance with an ASN.1-described data structure defined by ISO 9596; an EXTERNAL handler 33, which hands over to an upper layer, contents from decomposing an octet string encoded by the ASN.1 Basic Encoding Rules in accordance with the ASN.1-described data structure defined by ISO 8824; and an ASN.1 handler 34 for decomposing an octet string encoded by the ASN.1 Basic Encoding Rules in accordance with a data structure defined by using ISO 8824.

Now the operations of the preferred embodiment of the present invention will be described in detail.

FIGS. 4A and 4B respectively illustrate an encoded octet string which is taken out of a presentation PDU in the embodiment of the invention and another encoded octet string which is output to the application layer 30.

Figures 5A, 5B, 5C:
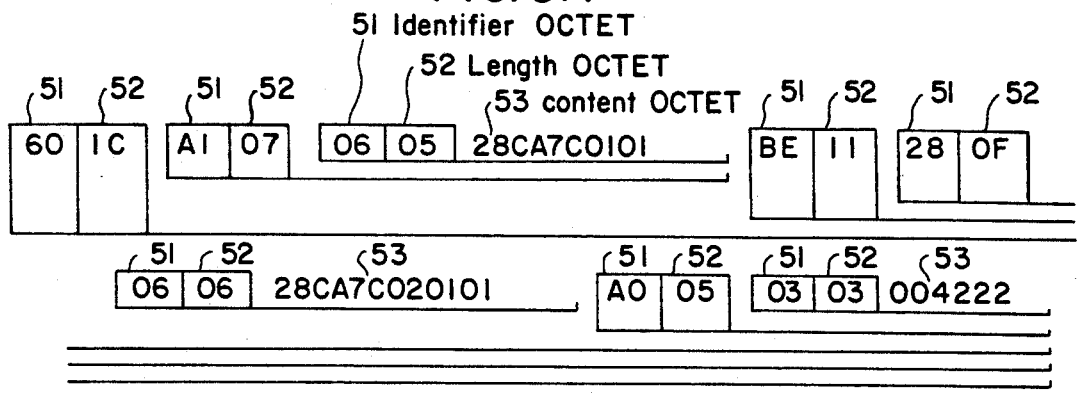
FIGS. 5A-5C illustrate an encoded octet string, which is to be decomposed by a first application service element of the application layer, and the standard and the result of decomposing the data structure thereof.

FIGS. 5A to 5C respectively illustrate an encoded octet string to be decomposed by the first application service element 31 of the application layer 30, the definitions of the data structure thereof, and the result of decomposing.

Figures 6A, 6B, 6C:
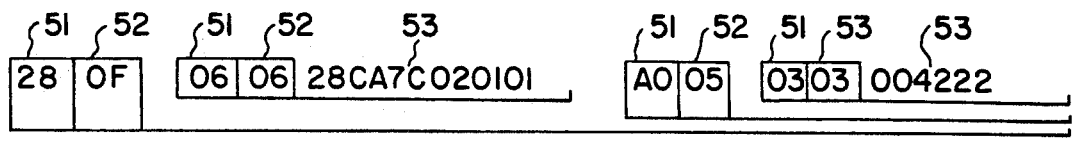
FIGS. 6A-6C illustrate the definition of an EXTERNAL type, to be decomposed by an EXTERNAL handler of the application layer, and the result of decomposing.

FIGS. 6A to 6C respectively illustrate an encoded octet string to be decomposed by the EXTERNAL handler 33 of the application layer 30, the definitions of the EXTERNAL type, and the result of decomposing.

FIGS. 7A to 7C respectively illustrate an encoded octet string to be decomposed by the second application service element 32 of the application layer 30, the definitions of the data structure thereof, and the result of decomposing.

Described in detail below, with reference to the accompanying drawings, are the processing operations of a preferred embodiment of the invention, operating on user data taken out by the presentation layer 20 from the PPDU 1 and shown in FIG. 4A, in the presentation layer 20 and the application layer 30.

Figure 2:
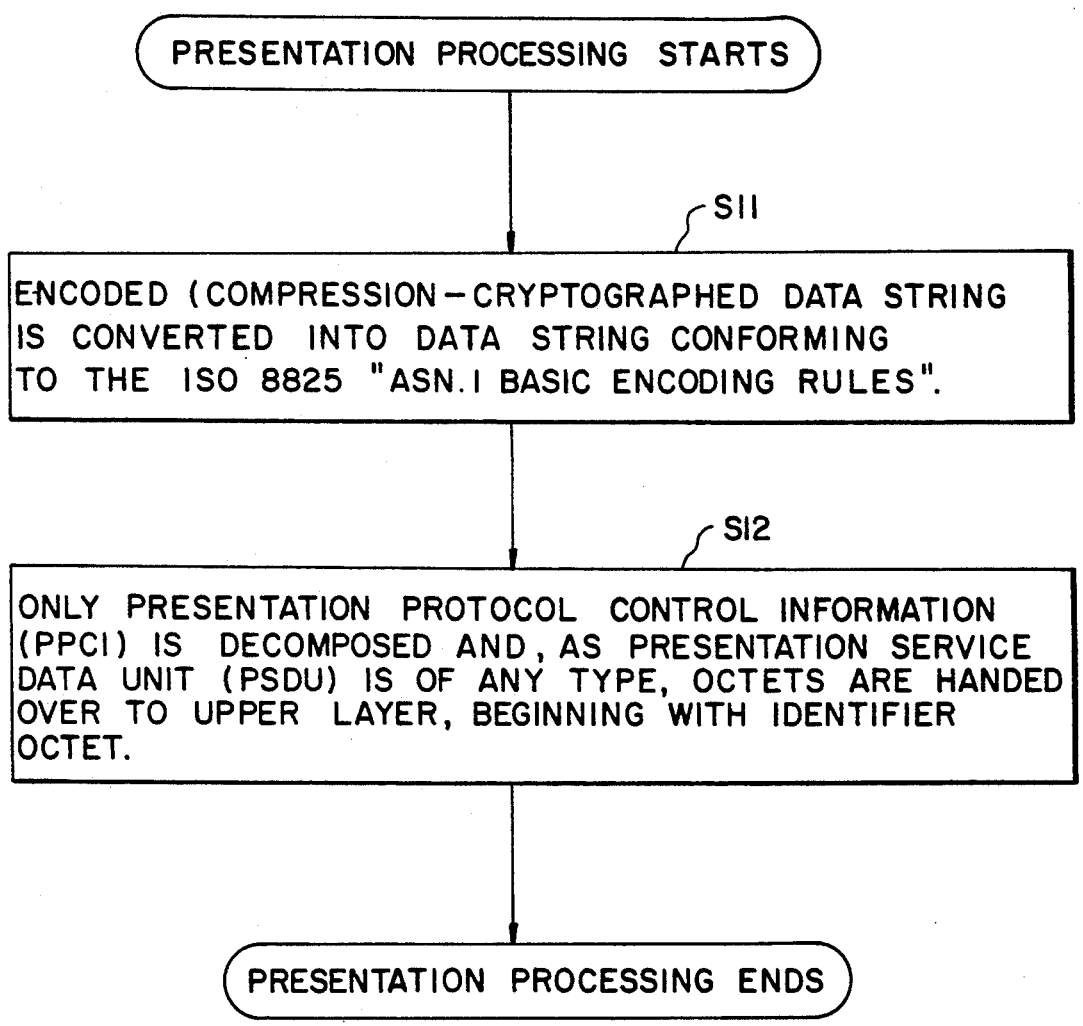
FIG. 2 illustrates processing operations of the preferred embodiment of the invention.

Referring to FIGS. 1 and 2, the presentation layer 20 in the preferred embodiment of the invention performs a processing function to convert data values in a transfer syntax form into data values in an abstract syntax form. The transfer syntax is the bit-inversion result of a data string encoded by the ASN.1 Basic Encoding Rules.

First, the presentation layer 20, having received the PPDU 1 from the session layer 10, decomposes the PPDU 1 into presentation protocol control information (PPCI) and a presentation service data unit (PSDU), and takes out user data as shown in FIG. 4A. The user data are decoded in accordance with information in the PPCI, i.e. bit-inverted (Step S1).

As a result, the presentation layer 20 hands over to the upper layer the decoded data as the user data of a presentation service parameter (Step S12).

The user data being handed over, the application layer 30 accepts them as the encoded octet string of an application protocol data unit (APDU) 2. Thus, in this preferred embodiment, the application layer 30 receives from the presentation layer 20 the APDU 2, which is an encoded data string as shown in FIG. 5A, as an abstract syntax (a form of data resulting from the conversion of data values in a transfer syntax form so as to be handled by a self-opening type system).

Figure 3:
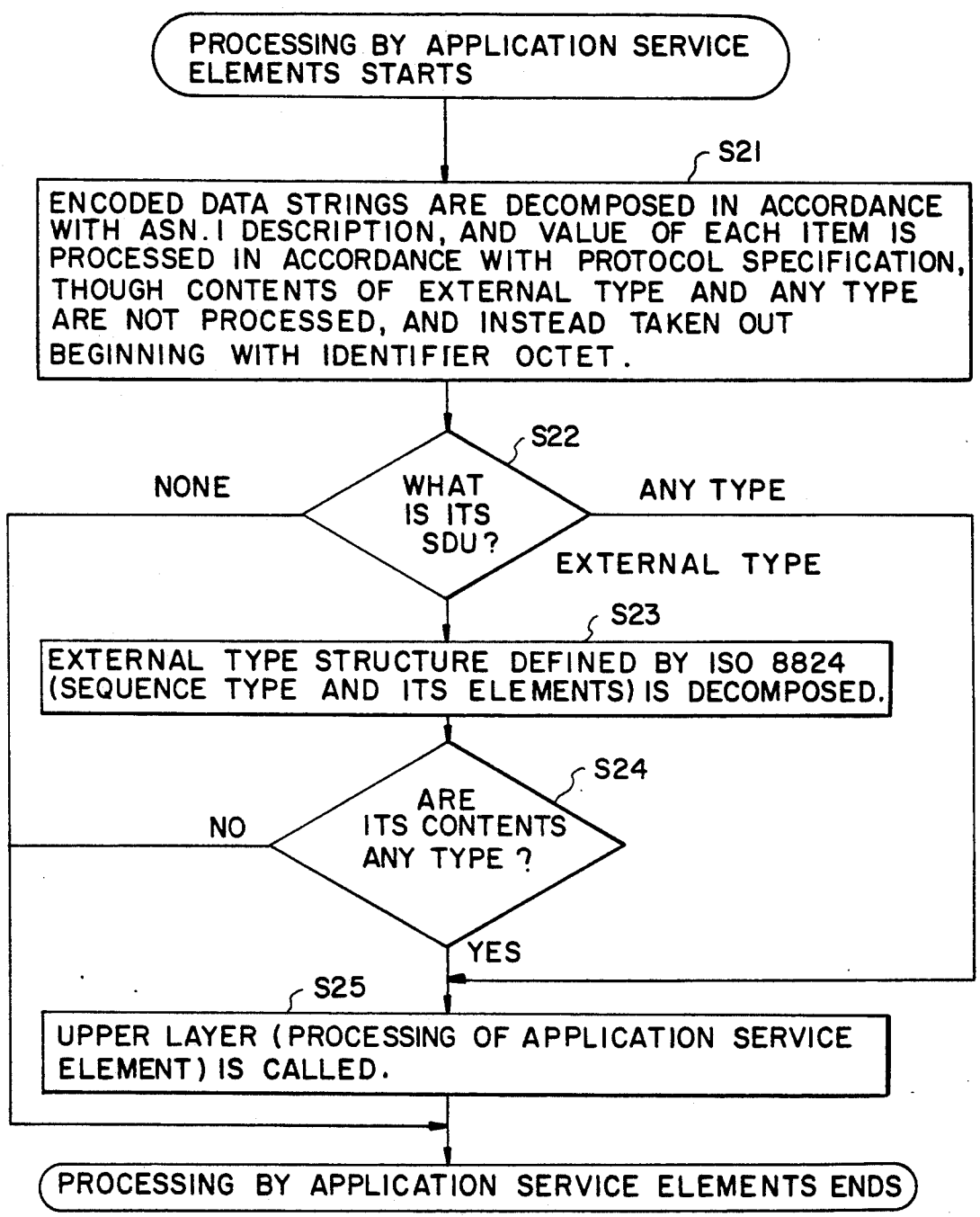
FIG. 3 illustrates a processing operation in the application layer.

Then, in this embodiment, each of the first application service element 31 and the second application service element 32 performs its own processing, while decomposing only the required (perceived) parts of the encoded data string handed over from the presentation layer 20 in the flow of processing shown in FIG. 3. The first and second application service elements 31 and 32, respectively, hands these parts over to the upper application service element (ASE).

The first service element 31, in decomposing the APDU shown in FIG. 5A in accordance with the ISO 8650 Standard shown in FIG. 5B, takes out the 5 octets of Item ① from the Contents octets at Step S21. As Item ② is of the EXTERNAL type, however, '280F060628CA7C020101A005030 3004222'H is taken out beginning with the Identifier octet. The actual decomposing is performed by the ASN.1 handler 34.

As the encoded data string shown in FIG. 6A, which has been taken out, is of the EXTERNAL type, it is decomposed at Step S22 by the EXTERNAL handler 33, using the ASN.1 handler 34, in accordance with the EXTERNAL type structure shown in FIG. 6B, and takes out 5 octets having the contents shown in FIG. 6C (Item ②), (Step S23).

Then, the encoded data string '03030004222'H, which has been taken out at Step S24, is handed over to the second application service element 32 (Step S25), and its processing is requested (this is a recursive call, and the process goes back to Step S21).

The second application service element 32 decomposes a received encoding, shown in FIG. 7A, by a common management information protocol shown in FIG. 7B, and takes out '4222'H of Item ① (Step S21). As its contents are not an encoded data string, the processing by the second application service element 32 is completed (Step S22). The process returns here to Step S25 in the processing by the first application service element 31, whose processing is also completed.

As hitherto described, the present invention provides the remarkable benefit of making it possible to achieve interfacing between packaged programs of various standards through the exchange of data in encoded octet strings, dispensing with the need to exchange decomposed data in structural entities of a fixed form, thereby contributing to the simplification of interfacing.

The invention gives the additional benefit of reducing the load on the whole upper layer of the open type system, because it further dispenses with the need to manage data structures defined by various standards (ASN.1-described) in the presentation layer. This accordingly saves the trouble of decomposing, decomposing being a relative load on the implementation programs of the different standards, whenever an ASN.1 handler is provided as a common subroutine, which can be called from each program.

What is claimed is:

1. An apparatus in which syntax conversion is employed, a syntax to be converted being represented by the International Standardization Organization (ISO) 8822 Presentation Service Definition and 8823 Presentation Protocol Specification of the Open Systems Interconnection (OSI) standard, said apparatus comprising:

a presentation layer including
input means for providing an input presentation protocol data unit (PPDU) in a transfer syntax form comprising a non-translated PPDU encoded in accordance with ISO 8825 Abstract Syntax Notation .1 (ASN.1) Basic Encoding Rules,
decoding means for translating said input PPDU into said non-translated PPDU, and
decomposing means for decomposing said non-translated PPDU into presentation protocol control information (PPCI) and into a non-translated application protocol data unit (APDU); and an application layer, coupled to said presentation layer for receiving said APDU, including
a first application service element,
a second application service element,
an external handler, and
an ASN.1 handler,
said first application service element
decomposing, in said ASN.1 handler, a first encoded data string included in said APDU to produce a value for each item of said first encoded data string, said first encoded data string being encoded in accordance with a first ASN.1 description, and
processing said value for said each item of said first encoded data string in accordance with a first protocol specification.
said second application service element
decomposing, in said ASN.1 handler, a second encoded data string included in said APDU to produce a value for each item of said second encoded data string, said second encoded data string being encoded in accordance with a second ASN.1 description, and
processing said value for said each item of said second encoded data string in accordance with a second protocol specification,
said external handler decomposing, in said ASN.1 handler, an EXTERNAL type data structure defined by ISO 8824 included in said APDU,
said second application service element, when an ANY type data structure is included in said [APDU] EXTERNAL type data structure, additionally processing said ANY type data structure.

2. An apparatus as claimed in claim 1, wherein said first application service element decomposes a portion of said data string encoded by ASN.1 Basic Encoding Rules in accordance with the ASN.1 described data structure defined by ISO 8650.

3. An apparatus as claimed in claim 1, wherein said second application service element decomposes a portion of said data string encoded by ASN.1 Basic Encoding Rules in accordance with ASN.1 described data structure defined by ISO 9596.

4. An apparatus as claimed in claim 1, wherein:
said external handler means transfers contents of said data string encoded by ASN.1 Basic Encoding Rules in accordance with ASN.1 described data structure defined by ISO 8824; and
said ASN.1 handler receives and decomposes said contents of said data string.

5. An apparatus as claimed in claim 1, wherein:
said first application service element decomposes a portion of said data string, encoded by ASN.1 Basic Encoding Rules in accordance with ASN.1 described data structure defined by ISO 8650;
said second application service element decomposes a portion of said data string encoded by ASN.1 Basic Encoding Rules in accordance with ASN.1 described data structure defined by ISO 9596;
said external handler transfers contents of said data string encoded by ASN.1 Basic Encoding Rules in accordance with ASN.1 described data structure defined by ISO 8824; and
said ASN.1 handler receives and decomposes said contents of said data string.

6. An apparatus as claimed in claim 1, including means for decomposing a portion of a data string encoded by ASN.1 Basic Encoding Rules in accordance with ASN.1 described data structure defined by ISO 8650.

7. An apparatus as claimed in claim 1, including means for decomposing a portion of a data string encoded by ASN.1 Basic Encoding Rules in accordance with ASN.1 described data structure defined by ISO 9596.

8. An apparatus as claimed in claim 1, including means for decomposing a portion of a data string encoded by ASN.1 Basic Encoding Rules in accordance with ASN.1 described data structure defined by ISO 8824.

9. An apparatus as claimed in claim 1, wherein said decoding means comprises means for dividing a data string into presentation protocol control information and presentation service data.

10. An apparatus as claimed in claim 1, including:
first means for decomposing a portion of a data string encoded by ASN.1 Basic Encoding Rules in accordance with the ASN.1 described data structure defined by ISO 8650;
second means for decomposing a portion of said data string encoded by ASN.1 Basic Encoding Rules in accordance with ASN.1 described data structure defined by ISO 9596; and
third means for decomposing a portion of said data string encoded by ASN.1 Basic Encoding Rules in accordance with ASN.1 described data structure defined by ISO 8824.

11. An apparatus as in claim 1 wherein said ASN.1 handler enables said first and second application service units to use said decomposing means of said presentation layer for decomposing said first and second ASN.1 descriptions, respectively, for outputting parameters for processing.

12. An apparatus in which syntax conversion is employed for a presentation layer of OSI defined by ISO 8822 Presentation Service Definition and ISO 8823 Presentation Protocol Specification, said apparatus comprising:
decoding means for decoding presentation protocol data units entered from a session layer;
decomposing means for decomposing an output of said decoding means with each of a plurality of protocol specification units defining an abstract syntax thereof and outputting a corresponding decomposed result; and an upper layer for receiving said corresponding decomposed result and further decomposing different portions of a data string of said decomposed result, said upper layer decomposing a first portion of said data string which is encoded in accordance with a first ASN.1 description to produce a first value output and processing said first value output in accordance with a first protocol specification,
   decomposing an EXTERNAL type data structure of said data string which is defined by ISO 8824, and
   checking whether said EXTERNAL type data structure includes an ANY type data structure and processing said ANY type data structure when so included.

13. An apparatus as in claim 12 wherein said upper layer uses said decomposing means for decomposing said first portion which is encoded in accordance with said first ASN.1 description for outputting parameters for processing.

14. A method using syntax conversion in a presentation layer of OSI defined by ISO 8822 Presentation Service Definition and ISO 8823 Presentation Protocol Specification, comprising the steps of:

decoding, by a decoding unit, data strings encoded in accordance with ISO 8825 ASN.1 Basic Encoding Rules and outputting decoded data strings;
   decomposing, by a decomposing unit, said decoded data strings using a corresponding protocol specification unit defining an abstract syntax thereof to provide a corresponding decomposed result;
   outputting said corresponding decomposed result to a further layer; and
   further decomposing, by said further layer, different portions of a data string of said data strings depending on whether said data string is an EXTERNAL type data string,
      said further decomposing step comprising
         decomposing a first portion of said data string which is encoded in accordance with a first ASN.1 description to produce a first value output and processing said first value output in accordance with a first protocol specification,
         decomposing an EXTERNAL type data structure of said data string which is defined by ISO 8824, and
         checking whether said EXTERNAL type data structure includes an ANY type data structure and processing said ANY type data structure when so included.

15. A method as claimed in claim 14, wherein said decomposing step includes dividing said data string into presentation protocol control information and presentation service data.

16. A method as claimed in claim 14, wherein said decomposing step includes decomposing said data string, said data string being previously encoded by ASN.1 Basic Encoding Rules in accordance with ASN.1 described data structure defined by ISO 9596.

17. A method for converting syntax as claimed in claim 14, wherein said decomposing step includes decomposing said data string, said data string being previously encoded by ASN.1 Basic Encoding Rules in accordance with ASN.1 described data structure defined by ISO 8650.

18. A method as claimed in claim 14, wherein said decomposing step includes decomposing said data string, said data string being previously encoded by ASN.1 Basic Encoding Rules in accordance with ASN.1 described data structure defined by ISO 8824.

19. A method as claimed in claim 14, wherein said decomposing step includes:

decomposing a portion said data string being previously encoded by ASN.1 Basic Encoding Rules in accordance with ASN.1 described data structure defined by ISO 9596;
   decomposing a portion of said data string being previously encoded by ASN.1 Basic Encoding Rules in accordance with ASN.1 described data structure defined by ISO 8650; and
   decomposing a portion of said data string being previously encoded by ASN.1 Basic Encoding Rules in accordance with ASN.1 described data structure defined by ISO 8824.

20. A method as in claim 14 wherein said further decomposing step uses said decomposing unit for decomposing said first portion which is encoded in accordance with said first ASN.1 description for outputting parameters for processing.

* * * * *